US008704475B2

(12) United States Patent
Yamaguchi et al.

(10) Patent No.: US 8,704,475 B2
(45) Date of Patent: Apr. 22, 2014

(54) CURRENT SOURCE INVERTER DEVICE

(75) Inventors: Takashi Yamaguchi, Tokyo (JP); Yugo Tadano, Tokyo (JP); Toru Kakebayashi, Tokyo (JP)

(73) Assignee: Meidensha Corporation, Tokyo (JP)

( * ) Notice: Subject to any disclaimer, the term of this patent is extended or adjusted under 35 U.S.C. 154(b) by 393 days.

(21) Appl. No.: 13/255,206

(22) PCT Filed: Mar. 5, 2010

(86) PCT No.: PCT/JP2010/053656
§ 371 (c)(1),
(2), (4) Date: Sep. 7, 2011

(87) PCT Pub. No.: WO2010/104008
PCT Pub. Date: Sep. 16, 2010

(65) Prior Publication Data
US 2011/0316463 A1  Dec. 29, 2011

(30) Foreign Application Priority Data
Mar. 9, 2009   (JP) .................. 2009-054354

(51) Int. Cl.
*H02P 6/18*  (2006.01)
*H02P 6/00*  (2006.01)
*H02P 6/16*  (2006.01)
*H02P 27/00*  (2006.01)
*H02P 3/18*  (2006.01)

(52) U.S. Cl.
USPC ............ 318/400.34; 318/400.01; 318/400.04; 318/400.3; 318/400.32; 318/400.35; 318/376; 318/700

(58) Field of Classification Search
USPC ............... 318/400.34, 400.3, 400.01, 400.35, 318/400.04, 400.32, 376, 700
See application file for complete search history.

(56) References Cited

U.S. PATENT DOCUMENTS 5,886,498 A * 3/1999 Sul et al. .................. 318/821
6,396,229 B1   5/2002 Sakamoto et al.
(Continued)

FOREIGN PATENT DOCUMENTS

DE   600 24 222 T2   8/2006
EP   1 133 050 B1   11/2005
(Continued)

OTHER PUBLICATIONS

T. Noguchi et al., "220000-r/min, 2-kW PM Motor Drive for Turbocharger", Journal of the Institute of Electrical Engineers of Japan D, vol. 125 (2005), No. 9, pp. 854-861.
(Continued)

Primary Examiner — Eduardo Colon Santana
Assistant Examiner — Gabriel Agared
(74) Attorney, Agent, or Firm — Foley & Lardner LLP

(57) ABSTRACT

Disclosed is a current source inverter device which controls the power factor in an arbitrarily configurable manner without a magnetic pole position detector. The device is provided with a current source inverter; a motor supplied with alternating current power from the current source inverter; and a control means which detects the terminal voltage of the motor, calculates the motor's internal induced voltage and the motor current that flows in the motor based on the detected terminal voltage, and controls the current source inverter. The control means calculates the phase difference ($\theta c$) between the terminal voltage and the motor current, the phase difference ($\theta x$) between the motor current and the internal induced voltage, and the phase difference ($\theta v$) between the terminal voltage and the internal induced voltage. An adjustment angle ($\theta \alpha$), which is the error in the phase difference between the motor current and the internal induced voltage when the set value of the phase difference ($\theta x$) is $\theta y$, is obtained from the conditional equation $\theta \alpha = \theta v - \theta y - \theta c$.

5 Claims, 3 Drawing Sheets

(56) References Cited

U.S. PATENT DOCUMENTS

| | | | |
|---|---|---|---|
| 2005/0029972 A1* | 2/2005 | Imai et al. | 318/254 |
| 2009/0108784 A1* | 4/2009 | Sakamoto et al. | 318/400.34 |
| 2010/0045219 A1* | 2/2010 | Ajima et al. | 318/400.04 |
| 2010/0141188 A1 | 6/2010 | Kakebayashi et al. | |

FOREIGN PATENT DOCUMENTS

| | | |
|---|---|---|
| JP | 10-285982 A | 10/1998 |
| JP | 2005-207362 A | 8/2005 |
| JP | 2008-295280 A | 12/2008 |
| WO | WO 2005/034331 A1 | 4/2005 |

OTHER PUBLICATIONS

Y. Takata et al., "Performance Improvement of Mechanical-Sensorless Operation of Pseudo Current-Source Inverter Fed Ultra High-Speed PM Motor", Transaction of Technical Committee of the Industry Applications Society of the Institute of Electrical Engineers of Japan, vol. 2005, No. 1, pp. 375-378.

* cited by examiner

| | | ω [rad/sec] | | | | |
|---|---|---|---|---|---|---|
| | | 0 | 10 | 50 | 100 | .... |
| $I_{dc}$ [A] | 0 | 1 | 11 | 21 | 31 | .... |
| | 5 | 2 | 12 | 22 | 32 | .... |
| | 10 | 3 | 13 | 23 | 33 | .... |
| | 15 | 4 | 14 | 24 | 34 | .... |
| | : | : | : | : | : | |
| | : | : | : | : | : | |

# CURRENT SOURCE INVERTER DEVICE

TECHNICAL FIELD

The present invention relates to a current source inverter device provided with a control means for control with no magnetic pole position sensor, and relates to improvement in power factor.

BACKGROUND ART

PM motors are used in electric vehicles and others. In many cases, it is requested to implement an inverter control system by a sensor-less system for driving a PM motor. As a sensor-less system, an analogue filter system is known which estimates a magnetic pole position of a PM motor on a basis of an internal induced voltage of the PM motor (see non-patent document 1, for example).

FIG. 6 shows an example of configuration of an inverter device (current source inverter device) based on sensor-less control depending on the internal induced voltage. This inverter device 10 includes a direct current power supply not shown, a 120-degree conduction inverter 2, a voltage sensor 3, a PM motor 4, an integrator circuit 5, and a logic conversion circuit 6. The voltage and current of the direct current power supply which are supplied to 120-degree conduction inverter 2 are represented by Vdc and Idc, respectively.

Integrator circuit 5 is configured to convert a terminal voltage "V" of PM motor 4, which is sensed by voltage sensor 3, to magnetic pole information by calculating an internal induced voltage "e" of PM motor 4 on a basis of terminal voltage V, and integrating the terminal voltage V.

Logic conversion circuit 6 is configured to receive input of an output of integrator circuit 5, and generate a current having a 120-degree conduction pattern synchronized with internal induced voltage e of PM motor 4 by using a logic circuit, and supply same to 120-degree conduction inverter 2.

The system shown in FIG. 6, which constitutes a control loop, may obtain phase information different from the phase of the internal induced voltage under the influence of the inductance of PM motor 4 at high load. If the power factor is controlled with this error in phase due to the inductance, the power factor falls from a desired power factor because of the error in measurement, which adversely affects the efficiency of operation.

In order to improve the power factor, a method is disclosed in which a delay processing circuit 7 is provided between integrator circuit 5 and logic conversion circuit 6 in inverter device 1 shown in FIG. 7 (see non-patent document 2, for example).

Delay processing circuit 7 is configured to delay by a predetermined amount the phase of the current having a 120-degree conduction pattern generated by logic conversion circuit 6.

PRIOR ART DOCUMENT

Non-Patent document

Non-patent document 1: Journal of the Institute of Electrical Engineers of Japan D, Vol. 125 (2005), No. 9, pp 854-861; and Non-patent document 2: Transaction of Technical Committee of the Industry Applications Society of the Institute of Electrical Engineers of Japan, Vol. 2005, No. 1, pp 375-378.

SUMMARY OF THE INVENTION

Problem(s) to be Solved by the Invention

The system described in non-patent document 2 compensates for the sensing error in the magnetic pole position by adjustment based on delay processing against the sensing error as described above, thus improving the efficiency and power factor of the motor. However, there has been a problem with this system that it is impossible to arbitrarily adjust the power factor.

The present invention is made in account of the problem described above, to provide a current source inverter device that performs control with the power factor arbitrarily set with no magnetic pole position sensor.

Means for Solving the Problem(s)

In order to solve the problem described above, the present invention is characterized in that: the present invention includes: a current source inverter that converts direct-current power into alternating-current power; a motor that is supplied with alternating-current power from the current source inverter; and a control means that controls the current source inverter with no magnetic pole position sensor by: sensing a terminal voltage of the motor; calculating an internal induced voltage of the motor on a basis of the sensed terminal voltage, a motor current flowing through a coil of the motor, and a coil impedance of the motor; converting the terminal voltage into magnetic pole position information by integrating the terminal voltage; and generating a current having a conduction pattern synchronized with the internal induced voltage; and the control means: calculates a phase difference $\theta c$ of the terminal voltage with respect to the motor current, wherein the phase difference $\theta c$ is expressed as a function containing a voltage value and a current value of a direct-current side of the current source inverter; calculates a phase difference $\theta v$ of the terminal voltage with respect to the internal induced voltage, wherein the phase difference $\theta v$ is expressed as a function containing a value of a phase difference $\theta x$ of the motor current with respect to the internal induced voltage, a value of the coil impedance of the motor, and a value of the motor current; and determines an adjusting angle $\theta \alpha$ by using a conditional equation of $\theta \alpha = \theta v - \theta y - \theta c$, wherein the adjusting angle $\theta \alpha$ is an error in the phase difference $\theta x$ of the motor current with respect to the internal induced voltage wherein $\theta y$ represents a setpoint of the phase difference $\theta x$.

According to the configuration described above, it is possible to calculate the adjusting angle $\theta \alpha$ by setting the phase difference $\theta y$, and set the phase difference of the motor current with respect to the internal induced voltage to a suitable value by the calculated adjusting angle $\theta \alpha$, and thereby achieve the set phase difference $\theta y$ or the power factor $\cos \theta y$ between the internal induced voltage of the motor and the motor current. This serves to enhance redundancy of control, and thereby achieve a motor control optimized for load conditions.

The present invention is characterized in that the coil impedance is assumed to have a resistance value of zero.

The present invention is characterized in that the phase difference $\theta y$ is assumed to be zero.

The present invention is characterized in that the motor current is determined by using a function containing the current value of the direct-current side of the current source inverter.

According to the configuration described above, by addition of each condition, it is possible to hold unknown variables constant which unknown variables are contained in the conditional equation for determining the adjusting angle θα, and thereby save calculation, and thereby reduce the load of calculation.

The present invention is characterized in that: the current source inverter device is provided with a phase adjusting time period table that is prepared on a basis of the current value of the direct-current side of the current source inverter and an angular speed of the motor; and the control means determines the adjusting angle θα with reference to the phase adjusting time period table.

According to the configuration described above, it is possible to reduce the load of calculation by the feature of selecting the adjusting angle θα by using the table.

Effect(s) of the Invention

According to the invention of claim 1, it is possible to calculate the adjusting angle θα by setting the phase difference θy, and set the phase difference of the motor current with respect to the internal induced voltage to a suitable value by the calculated adjusting angle θα, and thereby achieve the set phase difference θy or the power factor cos θy between the internal induced voltage of the motor and the motor current. This serves to enhance redundancy of control, and thereby achieve a motor control optimized for load conditions.

According to the invention of claims 2 to 4, by addition of each condition, it is possible to hold unknown variables constant which unknown variables are contained in the conditional equation for determining the adjusting angle θα, and thereby save calculation, and thereby reduce the load of calculation.

According to the invention of claim 5, it is possible to reduce the load of calculation by the feature of selecting the adjusting angle θα by using the table.

MODE(S) FOR CARRYING OUT THE INVENTION

The following describes a current source inverter device according to an embodiment of the present invention in detail with reference to the drawings. The configuration of this current source inverter device is the same as in FIG. 7. Accordingly, description of the current source inverter device is omitted. Incidentally, voltage sensor 3, integrator circuit 5, logic conversion circuit 6 and delay processing circuit 7 serve as a control means.

EXAMPLE 1

In this example, a vector diagram and others are used to obtain an equation expressing an adjusting angle for phase difference.

Figure 1:
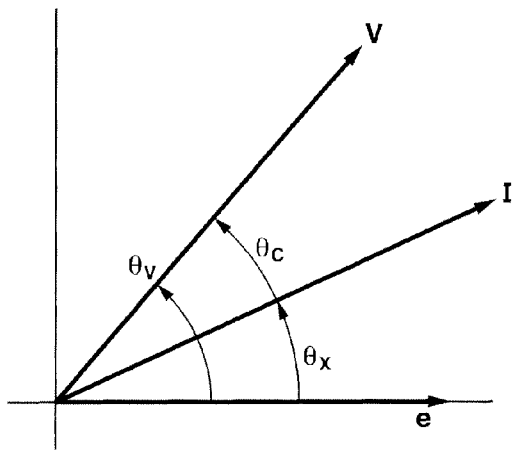
FIG. 1 is a vector diagram of an internal induced voltage, a terminal voltage and a motor current in the present embodiment.

FIG. 1 is a vector diagram of internal induced voltage e of PM motor 4, terminal voltage V of PM motor 4 sensed by voltage sensor 3, and motor current "I" which flows through a coil of PM motor 4 and is sensed by a current sensor not shown. θv represents a phase difference between internal induced voltage e and terminal voltage V. θx represents a phase difference between internal induced voltage e and motor current I. θc represents a phase difference between terminal voltage V and motor current I. In this case, the power factor between internal induced voltage e and motor current I is represented by cos θx.

Figure 2:
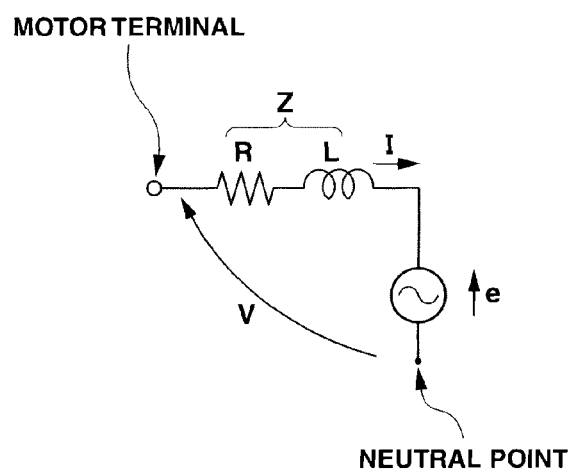
FIG. 2 is an equivalent circuit diagram of one phase section of a PM motor.

Further explanation is made with reference to FIG. 2. FIG. 2 is an equivalent circuit diagram of one phase section of PM motor 4. A motor coil impedance Z and internal induced voltage e are connected in series. Motor current I flows through the motor coil from a motor terminal to a neutral point. The potential difference between the motor terminal and the neutral point is represented by terminal voltage V.

<Derivation of Phase Difference θv> Terminal voltage V is expressed by equation (1) based on motor current I, internal induced voltage e, and motor coil impedance Z.

$$V = e + Z \cdot I \quad (1)$$

Motor current I is expressed by equation (2) with respect to internal induced voltage e.

$$I = I \cdot (\cos \theta x + j \sin \theta x) \quad (2)$$

Motor coil impedance Z is expressed by equation (3) where R represents the coil resistance of PM motor 4, L represents the coil inductance of PM motor 4, and ω represents the angular speed of PM motor 4.

$$Z = R + j\omega L \quad (3)$$

By substituting equations (2) and (3) into equation (1), equation (1) is reduced to equation (4) wherein internal induced voltage e is expressed as e=kω by using the electromotive force constant k of PM motor 4.

$$V = k\omega + (R + j\omega L) \cdot I \cdot (\cos \theta x + j \sin \theta x) \quad (4)$$

By expanding the equation (4), phase difference θv is determined by equation (5).

$$\theta v = \tan^{-1} \frac{\omega L I \cos \theta x + R I \sin \theta x}{k\omega + R I \cos \theta x - \omega L I \sin \theta x} \quad (5)$$

A phase difference occurs between the current of switching of 120-degree conduction inverter 2 and the motor current I due to the coil inductance of PM motor 4. This condition is shown in the waveform diagram of FIG. 3. The phase of motor current I is delayed from that of switching current $I^{sw}$ by the phase difference θc.

<Derivation of Phase Difference θc> Phase difference θc can be derived as follows. The terminal voltage "v" of each phase section of PM motor 4 is expressed by equation (6) as a rate of change of motor current "di" with respect to time with coil inductance L.

$$v = L\frac{di}{dt} \qquad (6)$$

Equation (6) is reduced to equation (7).

$$dt = L\frac{di}{v} \qquad (7)$$

Where "tc" represents a commutation time period at switching of each phase section of 120-degree conduction inverter 2, terminal voltage v and motor current di in equation (7) correspond to voltage Vdc and current Idc inputted into 120-degree conduction inverter 2, respectively, and coil inductance L in equation (7) corresponds to two phase sections.

Figures 4, 5:
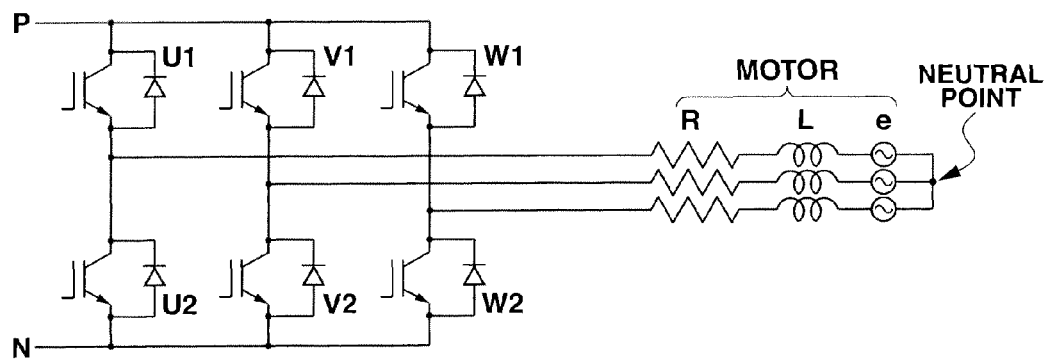
FIG. 4 is a diagram showing how an equation about a phase difference θc is obtained.
FIG. 5 is a diagram showing an offline table for a phase-adjusting time period in a fifth example.
Figure 6:
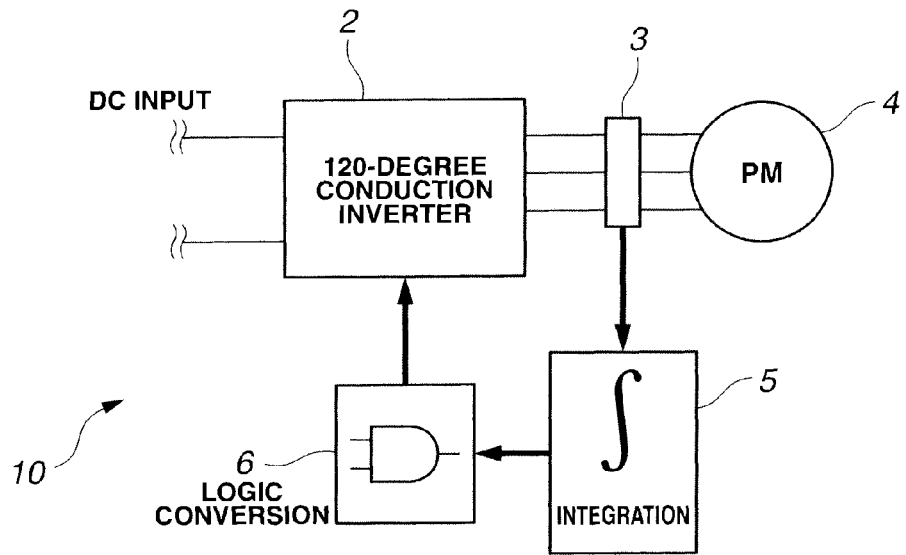
FIG. 6 is a diagram showing configuration of a conventional inverter device based on sensor-less control (current source inverter device)

The following describes with reference to FIG. 4 that coil inductance L thus corresponds to two phase sections.

Figure 7:
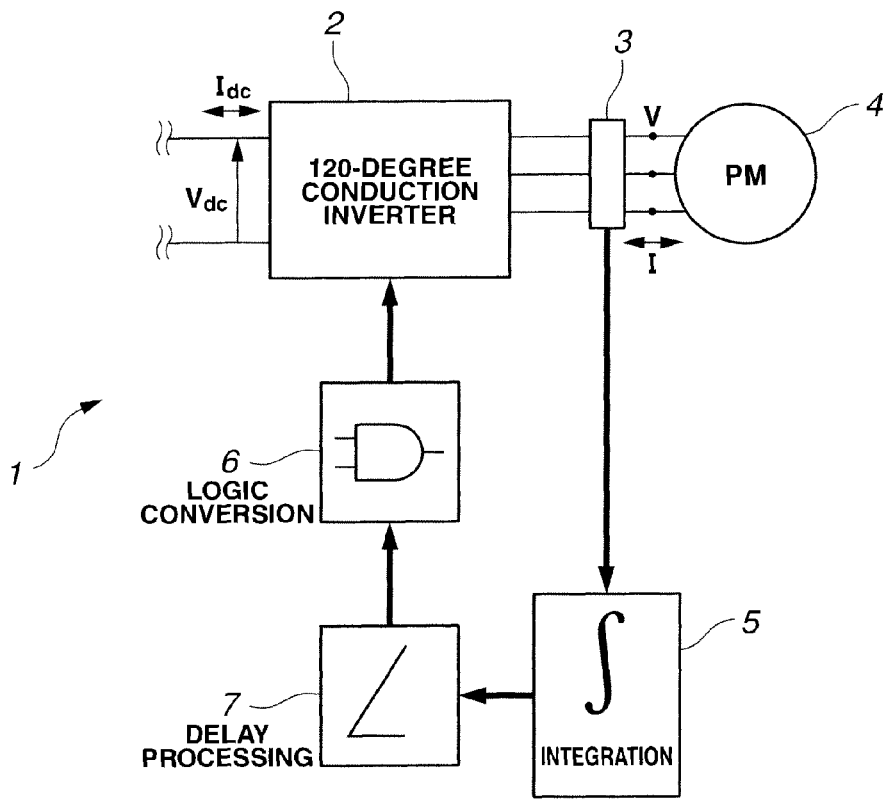
FIG. 7 is a diagram showing configuration of an inverter device based on sensor-less control (current source inverter device).

FIG. 4 shows simplified connection between 120-degree conduction inverter 2 and PM motor 4 of FIG. 7. 120-degree conduction inverter 2 is configured by three phase bridge connection of modules in each of which a switching element (IGBT, FET, etc.) and a diode are arranged in parallel.

In FIG. 4, when the switching element between U1 and V2 of 120-degree conduction inverter 2 is ON, a current flows through the coils of the U-phase and V-phase of PM motor 4. Accordingly, the inductance is equal to 2 L. Therefore, equation (7) is reduced to equation (8).

$$t_c = 2L\frac{Idc}{Vdc} \qquad (8)$$

In terms of angular speed ω, commutation angle θc and commutation time period tc are expressed by equation (9).

$$\omega = \frac{\theta c}{tc} \qquad (9)$$

Accordingly, θc is expressed by equation (10).

$$\theta c = \omega \frac{2L \cdot Idc}{Vdc} \qquad (10)$$

<Derivation of Adjusting Angle θα> With reference to FIG. 1, equation (11) is derived.

$$\theta x = \theta v - \theta c \qquad (11)$$

Here, an adjusting angle θα is defined as a delay angle that is an error in phase difference θx. Under the assumption that phase difference θx becomes phase difference θy by adjusting the phase difference θc by adjusting angle θα, equation (11) is reduced to equation (12).

$$\theta y = \theta v - (\theta c + \theta \alpha) \qquad (12)$$

Adjusting angle θα is expressed by equation (13).

$$\theta \alpha = \theta v - \theta y - \theta c \qquad (13)$$

By substituting equations (5) and (10) into equation (13), equation (13) is reduced to equation (14).

$$\theta \alpha = \tan^{-1}\frac{\omega L I\cos\theta y + R I\sin\theta y}{k\omega + R I\cos\theta y - \omega L I\sin\theta y} - \left(\omega \cdot \frac{2L \cdot Idc}{Vdc} + \theta y\right) \qquad (14)$$

Calculation of equation (14) is performed by a processor not shown in FIG. 7.

The following describes effects of equation (14).

Phase difference θy is set to a desired value of the phase difference between internal induced voltage e and motor current I. The difference between phase difference θx and phase difference θy is calculated by using equation (14). Accordingly, desired phase difference θy can be achieved by adjusting the phase difference between internal induced voltage e and motor current I by adjusting angle θα. Namely, even when power factor cos θy is set, the actual power factor deviates from the set power factor cos θy by a phase error due to coil inductance L, if no phase adjustment is made. In contrast, adjusting angle θα serves to set the actual power factor to the set power factor cos θy.

The feature that 120-degree conduction inverter 2 is a current source inverter and adjusting angle θα is calculated simply by using equations (5), (10) and (14), serves to reduce the calculation load, and allow high speed power factor adjustment control.

EXAMPLE 2

The calculation of equation (14) may cause a heavy calculation load because of inclusion of many trigonometric functions, and thereby cause a delay in the operation. Equation (14) can be simplified into equation (15) by ignoring R (R=0) in consideration that coil resistance R is small about several mΩ.

$$\theta \alpha = \tan^{-1}\frac{LI\cos\theta y}{k - LI\sin\theta y} - \left(\omega \cdot \frac{2L \cdot Idc}{Vdc} + \theta y\right) \qquad (15)$$

This saving of calculation serves to reduce the calculation load.

EXAMPLE 3

Although the power factor can be arbitrarily set by equation (14), it is conceivable that the power factor is set to 1 in many cases. Accordingly, equation (14) can be simplified into equation (16) by setting the phase difference θy to zero so that cos θy=1 and sin θy=0.

$$\theta \alpha = \tan^{-1}\frac{\omega L I}{k\omega + RI} - \left(\omega \cdot \frac{2L \cdot Idc}{Vdc}\right) \qquad (16)$$

This saving of calculation serves to reduce the calculation load.

EXAMPLE 4

Motor current I in equation (14) is calculated from direct-current-side current Idc of 120-degree conduction inverter 2 of FIG. 7, not obtained by sensing the current flowing through the coil of PM motor 4. The following describes this point.

Figure 3:
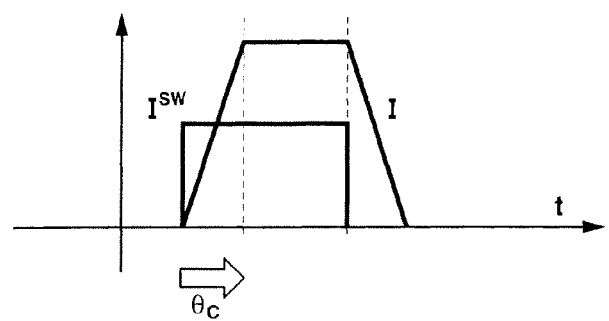
FIG. 3 is a waveform diagram showing a phase difference between a switching current and a motor current in the present embodiment.

In inverter device 1, the current waveform is rectangular as switching current $I^{sw}$ in FIG. 3, because of 120-degree conduction. If the period of rise of current is ignored and the current waveform is approximated as a rectangular waveform, the conduction duty per one period is equal to ⅔(=120°×2/360°). On the other hand, the peak value of motor current I corresponds to the inputted DC current Idc. Accordingly, the effective value of motor current I can be approximated by equation (17).

$$I \cong \sqrt{\frac{2}{3}} Idc \quad (17)$$

In addition, by substituting equation (17) into equation (14), equation (14) is reduced to equation (18).

$$\theta\alpha = \tan^{-1}\frac{\omega L \cdot \sqrt{\frac{2}{3}} Idc \cdot \cos\theta y + R \cdot \sqrt{\frac{2}{3}} Idc \cdot \sin\theta y}{k\omega + R \cdot \sqrt{\frac{2}{3}} Idc \cdot \cos\theta y - \omega L \cdot \sqrt{\frac{2}{3}} Idc \cdot \sin\theta y} - \left(\omega \cdot \frac{2L \cdot Idc}{Vdc} + \theta y\right) \quad (18)$$

This saving of calculation serves to reduce the calculation load.

In this connection, equations (15) and (16) can be also expressed in terms of DC current Idc by substitution of equation (17).

EXAMPLE 5

In this example, an offline table is used to save the calculation period.

Adjusting angle $\theta\alpha$ is calculated by using equation (14)-(16) when the waveform of motor current I is obtained, or by using equation (18) when it is not obtained.

On the assumption that DC current Idc (and motor current I except for equation (18)), angular speed $\omega$ of PM motor 4, power factor $\cos\theta y$ are input variables in equations (14)-(16) and (18), a four-dimensional (three-dimensional for equation (18)) table is prepared offline in which table the adjusting angle $\theta\alpha$ is determined on a basis of these input variables. The prepared table is set in a memory region (in the case of a CPU), so that it is possible to obtain the required adjusting angle $\theta\alpha$ with a short calculation period while the inverter is being driven.

In cases where $\cos\theta y$ is set to a fixed value as in example 3, and motor current I is expressed in terms of DC current Idc as in example 4, another method is sufficient which uses a two-dimensional table based on DC current Idc and motor angular speed $\omega$, not the four or less dimensional table described above. This serves to further save the calculation time period (including a period for referring to the table).

The following describes an example of the two-dimensional table with reference to the offline table of FIG. 5.

Online input variables are DC current Idc and motor angular speed $\omega$. The desired power factor $\cos\theta y$ is determined offline proactively. In the offline table of FIG. 5, an area enclosed by bold lines show phase adjusting time periods each of which corresponds to the two variables, wherein the phase adjusting time period corresponds to adjusting angle $\theta\alpha$. The prepared offline table is stored in a memory of a processor not shown. While 120-degree conduction inverter 2 is operating, the phase adjusting time period is selected on the basis of the two variables with reference to the offline table, and is set in delay processing circuit 7. In this regard, the values in the area enclosed by bold lines are only for the purpose of example, to which the phase adjusting time period is not limited. The unit of the phase adjusting time period may be set as appropriate.

The method described above can be extended to cases of examples 1 and 2, namely, can be implemented with the number of dimensions of the table increased.

The load of the processor can be reduced by selecting the adjusting angle $\theta\alpha$ with reference to the table in this example, in contrast to examples 1-4 where calculation of adjusting angle $\theta\alpha$ causes a calculation load.

Although the present invention has been described above in detail only by reference to written examples, various modifications and variations of the examples will occur to those skilled in the art within the technical concept of the present invention. Naturally, such modifications and variations belong to the scope of the claims.

| Description of Reference Signs | |
|---|---|
| 1, 10 | Inverter Devices |
| 2 | 120-Degree Conduction Inverter |
| 3 | Voltage Sensor |
| 4 | PM Motor |
| 5 | Integrator Circuit |
| 6 | Logic Conversion Circuit |
| 7 | Delay Processing Circuit |

The invention claimed is:

1. A current source inverter device, characterized in that:
the current source inverter device comprises:
   a current source inverter that converts direct-current power into alternating-current power;
   a motor that is supplied with alternating-current power from the current source inverter; and
   a control means that controls the current source inverter with no magnetic pole position sensor by: sensing a terminal voltage of the motor; calculating an internal induced voltage of the motor on a basis of the sensed terminal voltage, a motor current flowing through a coil of the motor, and a coil impedance of the motor; converting the terminal voltage into magnetic pole position information by integrating the terminal voltage; and generating a current having a conduction pattern synchronized with the internal induced voltage; and
the control means:
   calculates a phase difference $\theta c$ of the terminal voltage with respect to the motor current, wherein the phase difference $\theta c$ is expressed as a function containing a voltage value and a current value of a direct-current side of the current source inverter;
   calculates a phase difference $\theta v$ of the terminal voltage with respect to the internal induced voltage, wherein the phase difference $\theta v$ is expressed as a function containing a value of a phase difference $\theta x$ of the motor current with respect to the internal induced voltage, a value of the coil impedance of the motor, and a value of the motor current; and
   determines an adjusting angle $\theta\alpha$ by using a conditional equation of $\theta\alpha=\theta v-\theta y-\theta c$, wherein the adjusting angle $\theta\alpha$ is an error in the phase difference $\theta x$ of the motor current with respect to the internal induced voltage wherein $\theta y$ represents a setpoint of the phase difference $\theta x$.

2. The current source inverter device as claimed in claim 1, characterized in that the coil impedance is assumed to have a resistance value of zero.

3. The current source inverter device as claimed in claim 1, characterized in that the phase difference θy is assumed to be zero.

4. The current source inverter device as claimed in claim 1, characterized in that the motor current is determined by using a function containing the current value of the direct-current side of the current source inverter.

5. The current source inverter device as claimed in claim 1, characterized in that:
   the current source inverter device is provided with a phase adjusting time period table that is prepared on a basis of the current value of the direct-current side of the current source inverter and an angular speed of the motor; and
   the control means determines the adjusting angle θα with reference to the phase adjusting time period table.

* * * * *